(12) United States Patent
Han et al.

(10) Patent No.: US 10,167,011 B2
(45) Date of Patent: Jan. 1, 2019

(54) SYSTEM FOR COMPENSATING FOR DISTURBANCE OF MOTOR FOR MOTOR DRIVEN POWER STEERING

(71) Applicants: Hyundai Motor Company, Seoul (KR); Korea Advanced Institute of Science and Technology, Daejeon (KR)

(72) Inventors: Min Woo Han, Gyeonggi-do (KR); Woo Je Sung, Gyeonggi-do (KR); Jong Ho Lee, Incheon (KR); Sung Jun Kim, Gyeonggi-do (KR); Kyung Soo Kim, Daejeon (KR); Yong Hun Kim, Daejeon (KR)

(73) Assignees: Hyundai Motor Company, Seoul (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/232,295

(22) Filed: Aug. 9, 2016

(65) Prior Publication Data

US 2017/0166240 A1 Jun. 15, 2017

(30) Foreign Application Priority Data

Dec. 14, 2015 (KR) ................ 10-2015-0177858

(51) Int. Cl.
*H02P 6/08* (2016.01)
*B62D 5/04* (2006.01)
*H02P 6/28* (2016.01)

(52) U.S. Cl.
CPC ............. *B62D 5/046* (2013.01); *H02P 6/08* (2013.01); *H02P 6/28* (2016.02)

(58) Field of Classification Search
CPC ........ G05B 5/01; G05B 11/42; G05B 13/048; G05B 13/02; G05B 13/04; G05B 13/024;
(Continued)

(56) References Cited

U.S. PATENT DOCUMENTS 3,743,823 A * 7/1973 Berger ............... G05B 13/0205
                                                      700/38
4,195,337 A * 3/1980 Bertrand ................ G05B 13/04
                                                      318/561
(Continued)

FOREIGN PATENT DOCUMENTS

JP    2005-199780 A    7/2005
JP    3706296 B2       10/2005
(Continued)

OTHER PUBLICATIONS

Feedback Fundamentals, From Control System Design by Karl Johan Astrom, 2002.*

*Primary Examiner* — Kawing Chan
(74) *Attorney, Agent, or Firm* — Mintz Levin Cohn Ferris Glovsky and Popeo, P.C.; Peter F. Corless

(57) ABSTRACT

A system for compensating for disturbance of a motor for motor driven power steering is provided. The system for compensating for disturbance of a motor for motor driven power steering compensates for the disturbance based on a closed loop based input value prediction model unit, separately predicts an input value from a command by a closed loop based input value prediction model unit, and compensates for disturbance in accordance with a desired disturbance frequency band when there is a difference between the predicted input value and an input value error-compensated by a feedback controller.

4 Claims, 2 Drawing Sheets

(58) Field of Classification Search
CPC .... G05B 13/042; G05B 15/02; G05B 19/416; G05B 2219/25298; G05B 2219/33347; G05B 2219/41213; G05B 2219/41426; G06F 17/01
See application file for complete search history.

(56) References Cited

U.S. PATENT DOCUMENTS

| | | | | |
|---|---|---|---|---|
| 5,239,248 A * | 8/1993 | Shimada | ............... | G05B 19/291 318/568.12 |
| 5,519,605 A * | 5/1996 | Cawlfield | ............ | G05B 13/048 700/31 |
| 5,666,034 A * | 9/1997 | Seoung | ................... | H02P 23/16 242/334.2 |
| 5,999,361 A * | 12/1999 | Kim | ..................... | G11B 5/5547 360/78.04 |
| 6,252,369 B1 * | 6/2001 | Kaku | ................... | G05B 13/024 318/609 |
| 6,619,086 B1 * | 9/2003 | Ikeda | ...................... | B21B 37/50 700/152 |
| 6,934,116 B2 * | 8/2005 | Iwashiro | .............. | G11B 5/5547 360/78.04 |
| 7,004,280 B2 * | 2/2006 | Shirato | .................. | B62D 5/001 180/443 |
| 7,031,099 B2 * | 4/2006 | Kohso | ................... | G11B 5/4826 360/75 |
| 7,084,596 B2 * | 8/2006 | Iwashita | .............. | G05B 19/404 318/630 |
| 7,142,930 B2 * | 11/2006 | Shimada | ................ | G05B 13/04 700/29 |
| 7,158,334 B2 * | 1/2007 | Iwashiro | ............ | G11B 5/59627 360/77.02 |
| 7,380,447 B2 * | 6/2008 | Rollinger | .............. | G01M 15/09 73/114.32 |
| 7,469,189 B2 * | 12/2008 | Yasuo | ..................... | G06F 11/24 702/185 |
| 7,599,762 B2 * | 10/2009 | Discenzo | .............. | B66C 13/063 701/1 |
| 7,953,502 B2 * | 5/2011 | Takaishi | ............... | G11B 5/5582 318/560 |
| 7,954,593 B2 * | 6/2011 | Dornhege | ........... | B62D 5/0472 180/443 |
| 8,027,119 B2 * | 9/2011 | Zhang | .................. | G11B 5/5582 360/61 |
| 8,041,436 B2 * | 10/2011 | Gao | ......................... | G05B 5/01 318/561 |
| 8,060,340 B2 * | 11/2011 | Gao | ....................... | G05B 13/04 702/182 |
| 8,129,936 B2 * | 3/2012 | Becker | ................... | H02P 21/30 318/767 |
| 8,180,464 B2 * | 5/2012 | Gao | ......................... | G05B 5/01 700/28 |
| 8,644,963 B2 * | 2/2014 | Gao | ......................... | G05B 5/01 700/28 |
| 8,797,673 B2 * | 8/2014 | Supino | ................. | G11B 5/5582 360/77.02 |
| 9,007,004 B2 * | 4/2015 | Hunter | ................ | H02P 21/0003 318/400.02 |
| 9,041,336 B2 * | 5/2015 | Hosek | ....................... | H02P 6/10 318/560 |
| 9,102,352 B1 * | 8/2015 | Nierobisch | .......... | B62D 5/0472 |
| 9,268,315 B2 * | 2/2016 | Gao | ......................... | G05B 5/01 |
| 2002/0128730 A1 * | 9/2002 | Shimada | ................ | G05B 13/04 700/29 |
| 2003/0030937 A1 * | 2/2003 | Kohso | .................. | G11B 5/4826 360/78.05 |
| 2003/0039054 A1 * | 2/2003 | Pasolini | ............... | G11B 5/5552 360/75 |
| 2003/0174432 A1 * | 9/2003 | Iwashiro | .............. | G11B 5/5547 360/78.04 |
| 2003/0199997 A1 * | 10/2003 | Gao | ......................... | G05B 5/01 700/18 |
| 2005/0193284 A1 * | 9/2005 | Yasuo | ..................... | G06F 11/24 714/48 |
| 2005/0243458 A1 * | 11/2005 | Iwashiro | ............ | G11B 5/59627 360/77.02 |
| 2007/0050115 A1 * | 3/2007 | Discenzo | .............. | B66C 13/063 701/50 |
| 2007/0295067 A1 * | 12/2007 | Rollinger | .............. | G01M 15/09 73/114.32 |
| 2008/0065240 A1 * | 3/2008 | Takaishi | ............... | G11B 5/5582 700/37 |
| 2009/0005886 A1 * | 1/2009 | Gao | ......................... | G05B 5/01 700/29 |
| 2009/0078494 A1 * | 3/2009 | Dornhege | ........... | B62D 5/0472 180/446 |
| 2009/0116136 A1 * | 5/2009 | Zhang | .................. | G11B 5/5582 360/75 |
| 2009/0143871 A1 * | 6/2009 | Gao | ......................... | G05B 13/04 700/29 |
| 2010/0079104 A1 * | 4/2010 | Becker | ................... | H02P 21/30 318/802 |
| 2010/0268354 A1 * | 10/2010 | Takaishi | ............... | G11B 5/5582 700/37 |
| 2012/0283850 A1 * | 11/2012 | Gao | ......................... | G05B 5/01 700/45 |
| 2012/0320471 A1 * | 12/2012 | Supino | ................. | G11B 5/5582 360/75 |
| 2013/0221885 A1 * | 8/2013 | Hunter | ................ | H02P 21/0003 318/400.15 |
| 2014/0139162 A1 * | 5/2014 | Hosek | ....................... | H02P 6/10 318/432 |
| 2014/0195013 A1 * | 7/2014 | Gao | ......................... | G05B 5/01 700/45 |
| 2014/0257528 A1 * | 9/2014 | Perez | ..................... | G05B 13/047 700/46 |
| 2015/0232121 A1 * | 8/2015 | Nierobisch | .......... | B62D 5/0472 701/41 |
| 2016/0154388 A1 * | 6/2016 | Gao | ......................... | G05B 5/01 700/29 |

FOREIGN PATENT DOCUMENTS

| | | |
|---|---|---|
| JP | 2008-254686 A | 10/2008 |
| KR | 2006-0012321 A | 2/2006 |
| KR | 2011-0072143 A | 6/2011 |
| KR | 2012-0056952 A | 6/2012 |
| KR | 2015-0055354 A | 5/2015 |

* cited by examiner

SYSTEM FOR COMPENSATING FOR DISTURBANCE OF MOTOR FOR MOTOR DRIVEN POWER STEERING

CROSS-REFERENCE TO RELATED APPLICATION

This application claims under 35 U.S.C. § 119(a) the benefit of Korean Patent Application No. 10-2015-0177858 filed on Dec. 14, 2015, the entire contents of which are incorporated herein by reference.

BACKGROUND (a) Technical Field

The present invention relates to motor driven power steering, more particularly, to a system for compensating for disturbance of a motor for motor driven power steering, which compensates for the disturbance by utilizing a closed loop based input value prediction model unit.

(b) Description of the Related Art

Recently, certain vehicles have been equipped with a motor driven power steering (MDPS) system in which the steering force of a steering wheel is changed according to a travelling speed.

A permanent magnet synchronous motor typically is used as a motor in the motor driven power steering system, and the permanent magnet synchronous motor is generally used for three kinds of usage, that is, torque control, speed control, and position control by using a current control.

The torque control of the motor is a basic control process of the speed control and the position control, and is commonly referred to as current control because a current is directly proportional to a torque.

Torque control, that is, current control, is generally performed by a PI controller and a linear feedback control, but has a disadvantage in that control stability deteriorates due to the influence of disturbance, such as back electromotive force (back-emf).

When a permanent magnet is rotated, a change in magnetic flux induced in a stator and a current of the stator interact with each other, so that non-linearity is generated by back electromotive force, and the non-linearity may change a motor model or may be interpreted as a disturbance.

Accordingly, non-linearity caused by the disturbance, such as back electromotive force, may be predicted based on parameter values of a motor circuit and by measuring a current and a speed of the motor, but in order to compensate for non-linearity, it is necessary to design an additional controller.

Accordingly, in order to compensate for the influence of back electromotive force, a feed-forward and feed-back control method is mainly used, but the method has a problem in that the method is sensitive to a change of unpredicted parameters, and a motor speed needs to be accurately measured.

When a speed of the motor is frequently changed, such as the MDPS system, back electromotive force is changed to influence a voltage input into the motor, and the current is undesirably controlled, so that compensation for back electromotive force is necessary for accurate control of the motor current.

However, the existing method of compensating for disturbance, such as back electromotive force, compensates for the disturbance adequately when a speed of the motor is not changed, but does not compensate for the disturbance, such as back electromotive force, when a speed of the motor is rapidly changed.

The above information disclosed in this Background section is only for enhancement of understanding of the background of the invention and therefore it may contain information that does not form the prior art that is already known in this country to a person of ordinary skill in the art.

SUMMARY

An object of the present invention is to provide a system for compensating for disturbance of a motor for motor driven power steering, which separately predicts an input value (a voltage value input into a motor) from a command (current command value) by a closed loop based input value prediction model unit, and compensates for disturbance in accordance with a desired disturbance frequency band when there is a difference between the predicted input value and an input voltage value error-compensated by a feedback controller.

In one aspect, the present invention provides a system for compensating for disturbance of a motor for motor driven power steering, the system including: a feedback controller configured to output a voltage value obtained by compensating for an error between a current command value and a current output value; a closed-loop based input prediction model unit configured to separately predict an input voltage value for a motor based on the current command value separately from the feedback controller; and a disturbance compensating unit configured to, when there is a difference between the input voltage value predicted by the closed-loop based input prediction model unit and the voltage value output from the feedback controller, determine that disturbance exists and perform a disturbance compensation control.

Through the aforementioned technical solutions, the present invention provides the effects below.

According to the present invention, it is possible to offset and compensate for disturbance of a desired frequency band by using the disturbance compensating unit, which is capable of tuning β (disturbance compensating unit function) in accordance with a disturbance frequency.

That is, the present invention may perform disturbance compensation tuning in accordance with disturbance of a high frequency band or a low frequency band, and may offset disturbance of a desired band even without using a low frequency filter, a notch-filter filtering a specific frequency, and the like.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
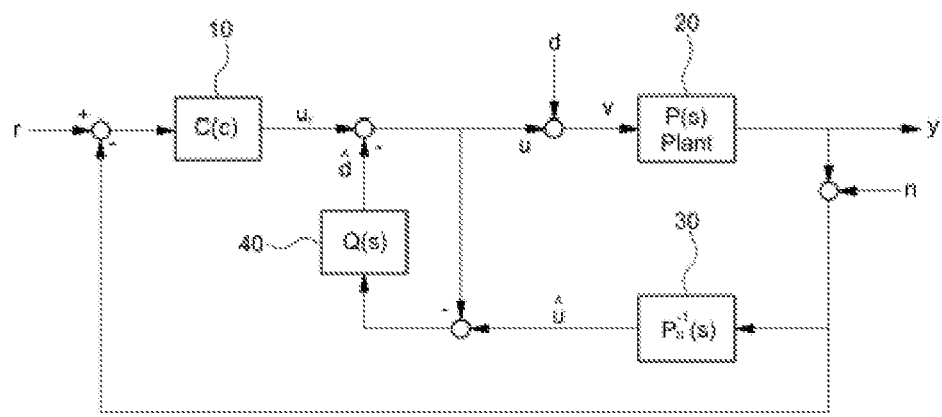
FIG. 1 is a control block diagram illustrating an existing system for compensating for disturbance of a motor for motor driven power steering.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

First, for helping to understand the present invention, an existing system for compensating for disturbance of a motor will be described below.

FIG. 1 illustrates a configuration of an existing system for compensating for disturbance of a motor for motor driven power steering (MDPS).

In FIG. 1, reference numeral 10 indicates a feedback controller, reference numeral 20 indicates a motor, reference numeral 30 indicates a motor nominal reverse model unit, and reference numeral 40 indicates a disturbance compensating unit (disturbance observer).

A current output value y output from the motor 20 needs to follow a current command value r, so that it is necessary to remove an error between the current command value r and the current output value y.

Accordingly, the feedback controller 10 compensates for the error between the current command value r and the current output value y, and outputs an error-compensated voltage value Ur as an input value for the motor.

In conjunction with the present invention, if the error-compensated voltage value Ur is input into the motor 20, but a desired command, that is, the error-compensated voltage, is not applied to the motor due to disturbance (back electromotive force, noise, and the like), the disturbance must be predicted and compensated.

Accordingly, the disturbance is predicted and compensated by using the motor nominal reverse model unit 30 adopting a reverse model of the motor and the disturbance compensating unit 40.

A method of predicting and compensating for the disturbance includes a process of outputting an input predicted value a for predicting disturbance by the motor nominal reverse model unit 30, and a process of outputting a disturbance compensating value $\hat{d}$ based on the input predicted value by the disturbance compensating unit 40.

Accordingly, when a sum of the voltage value Ur error-compensated by the feedback controller 10 and the disturbance compensation output $\hat{d}$ from the disturbance compensating unit 40 is output as a total control unit u, disturbance d is compensated with the disturbance compensation value $\hat{d}$.

Finally, the disturbance compensated motor input voltage value v is applied to the motor.

However, since the existing system for compensating for disturbance uses the motor nominal reverse model, the system cannot freely compensate for low-frequency disturbance or high-frequency disturbance, thereby degrading a degree of freedom of the disturbance compensation.

Here, a system for compensating for disturbance of a motor of the present invention will be described below.

Figure 2:
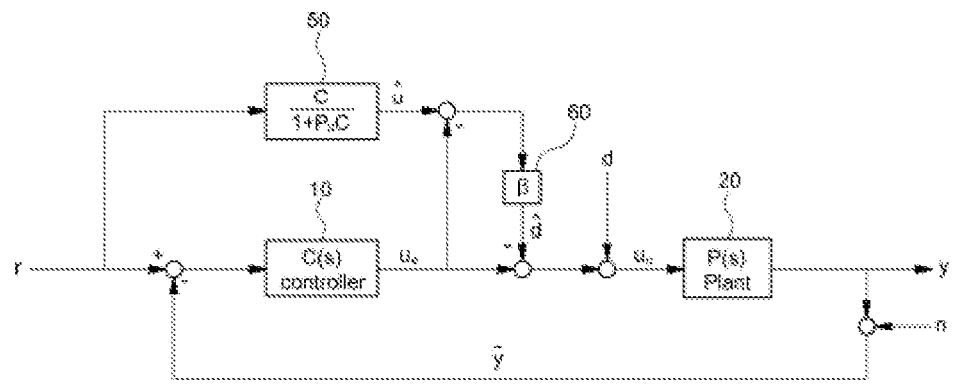
FIG. 2 is a control block diagram illustrating a system for compensating for disturbance of a motor for motor driven power steering according to the present invention.
Figure 3:
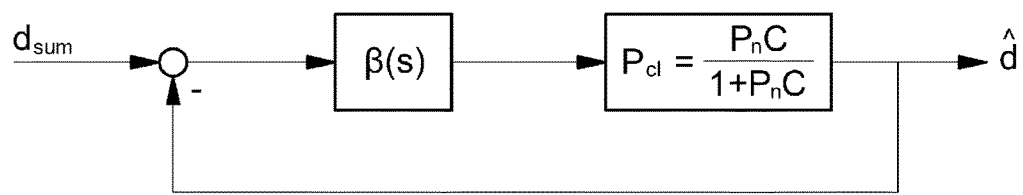
FIG. 3 is a control block diagram illustrating a relationship between a disturbance compensation value and actual disturbance in the system for compensating for disturbance of the motor for motor driven power steering according to the present invention.

FIG. 2 illustrates a configuration of a system for compensating for disturbance of a motor for MDPS according to the present invention.

In FIG. 2, reference numeral 10 indicates a feedback controller, reference numeral 20 indicates a motor, reference numeral 50 indicates a closed loop based input prediction model unit, and reference numeral 60 indicates a disturbance compensating unit (disturbance observer).

The closed loop based input prediction model unit 50 is a logic unit for separately predicting an input voltage value û for a motor based on a command (current command value r), and is a kind of control logic unit created by combining a motor plant Pn and the feedback controller C, and may be expressed by Equation $$\frac{C}{1+P_nC}.$$

In this case, when there is a difference between the input voltage value û predicted by the closed loop based input prediction model unit 50 and a voltage value Uc, which is obtained by compensating for an error between the current command value r and the current output value y by the feedback controller 10, it is determined that disturbance exists.

Next, the disturbance compensating unit 60 determines that the disturbance exists and performs a series of disturbance compensating and controlling processes described below.

A relationship between the current output value y, the current command value r, the disturbance d, and noise n when the disturbance compensating unit 60 is not applied may be expressed by Equation 1 below, and a relationship between the current output value y, the current command value r, the disturbance d, and noise n when the disturbance compensating unit 60 is applied may be expressed by Equation 2 below.

$$y = \frac{PC}{1+PC}r + \frac{P}{1+PC}d - \frac{PC}{1+PC}n \quad \text{[Equation 1]}$$

$$y = \frac{PC}{1+P_nC}r + \frac{P}{1+(\beta+1)PC}d - \frac{(\beta+1)PC}{1+(\beta+1)PC}n \quad \text{[Equation 2]}$$

In Equations 1 and 2, y represents a current output value, r represents a current command value, d represents disturbance, n represents noise, P represents a motor plant, C represents the feedback controller, and β represents a disturbance compensating unit function.

Here, it can be seen in Equation 2 that when β is increased compared to that of Equation 1, a denominator of a second term is increased, and as a result, an influence of the disturbance d is decreased, and in contrast to this, in a case of noise, a denominator and a numerator are simultaneously increased, so that an influence of noise is gradually increased.

In this case, the disturbance compensated value d̂ output from the disturbance compensating unit 60 is calculated by Equation 3 below.

$$\hat{d} = \frac{\beta P_n C}{(\beta+1)P_nC+1}d \quad \text{[Equation 3]}$$

In Equation 3, if 1 is a small number and thus is ignored, $P_nC$ of a denominator and a numerator is reduced, and as a result, when the β (disturbance compensating unit function) is increased, the disturbance compensated value d̂ becomes close to actual disturbance d. However, the complete disturbance compensation is achieved when β is infinite, such that it is impossible.

In the meantime, the disturbance compensated value d̂ output from the disturbance compensating unit 60 is output in the form of following a total sum of the actual disturbance, that is, disturbance sum $d_{sum}$, as can be seen in FIG. 4, so that the β may be set with a value, which is adjustable in accordance with a disturbance frequency, and thus it is possible to compensate for only disturbance of a desired specific frequency band by adjusting the β in accordance with a disturbance frequency.

To this end, when it is assumed that a disturbance target frequency function for compensating the disturbance is H when the disturbance compensating unit 60 calculates a disturbance compensation value, the H may be expressed by Equation 4 below, and when Equation 4 is organized, Equation 4 is expressed by Equation 5 below.

$$\frac{\hat{d}}{d} = H = \frac{\beta P_n C}{(\beta+1)P_nC+1} \quad \text{[Equation 4]}$$

$$\beta = \frac{H}{1-H}\left(1+\frac{1}{P_nC}\right) \quad \text{[Equation 5]}$$

In Equations 4 and 5, d represents disturbance, d̂ represents a disturbance compensation value, $P_n$ represents a motor nominal model, C represents the feedback controller, and β represents a disturbance compensating unit function, and the motor nominal model $P_n$, the feedback controller C, and the like are complex numbers.

Accordingly, β may be set with Equation 5 according to the disturbance target frequency function.

When the $P_nC$ is sufficiently large, Equation 5 is approximated to Equation 6 below.

$$\beta \approx \frac{H}{1-H} \quad \text{[Equation 6]}$$

Accordingly, it is possible to perform disturbance compensation following the target frequency function based on Equation 6, so that disturbance compensation tuning in accordance with disturbance of a high frequency band or a low frequency band is possible.

That is, when it is assumed that the disturbance target frequency function is H when the disturbance compensating unit 60 calculates the disturbance compensation value d̂, β is set with Equation 5 according to the disturbance target frequency function H, and when $P_nC$ in Equation 5 is sufficiently large, β is approximated to H/1−H as expressed in Equation 6, so that the disturbance compensating unit 60 may perform the disturbance compensation following the target frequency function H.

As described above, the present invention may offset and compensate for disturbance of a desired band by using the closed-loop based input prediction model unit 50 and the disturbance compensating unit 60, which is capable of tuning β in accordance with a frequency of disturbance.

That is, even without using a low frequency filter, a notch-filter filtering a specific frequency, and the like, when the disturbance target frequency function H is defined, it is possible to calculate β, so that it is possible to offset disturbance of a desired band.

In the meantime, in order to remove the error between the current command value r and the current output value y, the error-compensated voltage value Uc output from the feedback controller 10 is input into the motor 20 in the disturbance compensated state as it is.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A system for compensating for disturbance of a motor for motor driven power steering, the system comprising:
   a feedback controller configured to output a voltage value obtained by compensating for an error between a current command value and a current output value;
   a closed-loop based input prediction model unit configured to separately predict an input voltage value for the motor based on the current command value separately from the feedback controller; and
   a disturbance compensating unit configured to, when there is a difference between the input voltage value predicted by the closed-loop based input prediction model unit and the voltage value output from the feedback controller, determine that the disturbance exists and perform a disturbance compensation control for the output voltage of the feedback controller,
   wherein the closed loop based input prediction model unit is configured to predict the input voltage value for the motor based on the current command value, and is a combination of a motor model ($P_n$) and the feedback controller (C), and expressed by Equation:

$$\frac{C}{1 + P_n C},$$

wherein C represents the feedback controller and $P_n$ represents the motor model,
   wherein the disturbance compensating unit outputs a disturbance compensation value calculated by the Equation $$\hat{d} = \frac{\beta P_n C}{(\beta + 1) P_n C + 1} d,$$

and
   wherein d represents disturbance, $\hat{d}$ represents a disturbance compensation value, $P_n$ represents a motor nominal model, C represents the feedback controller, and β represents a disturbance compensating unit function, and
   wherein the error-compensated voltage value output from the feedback controller by the disturbance compensation control by the disturbance compensating unit is input into the motor.

2. The system of claim 1, wherein the disturbance compensating unit outputs the disturbance compensation value in a form of following a disturbance sum, so that the β is set with a value adjustable in accordance with a disturbance frequency.

3. The system of claim 1, wherein when it is assumed that a disturbance target frequency function is H when the disturbance compensating unit calculates a disturbance compensation value, β is set by the Equation $$\beta = \frac{H}{1-H}\left(1 + \frac{1}{P_n C}\right)$$

according to the disturbance target frequency function,
   wherein d represents disturbance, $\hat{d}$ represents a disturbance compensation value, $P_n$ represents a motor nominal model, C represents the feedback controller, and β represents a disturbance compensating unit function.

4. The system of claim 3, wherein when $P_n C$ is sufficiently large in the Equation $$\beta = \frac{H}{1-H}\left(1 + \frac{1}{P_n C}\right),$$

the Equation $$\beta = \frac{H}{1-H}\left(1 + \frac{1}{P_n C}\right)$$

is approximated to the Equation $$\beta \approx \frac{H}{1-H},$$

so that the disturbance compensating unit performs the disturbance compensation following the target frequency function,
   wherein d represents disturbance, $\hat{d}$ represents a disturbance compensation value, $P_n$ represents a motor nominal model, C represents the feedback controller, and β represents a disturbance compensating unit function.

* * * * *